A. B. DRÄGER.
UNIVERSAL COUPLING.
APPLICATION FILED JAN. 12, 1911.
1,033,681.
Patented July 23, 1912.
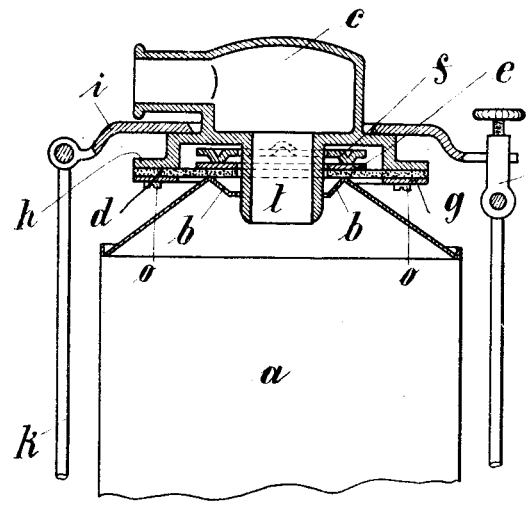
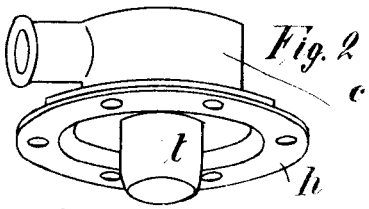
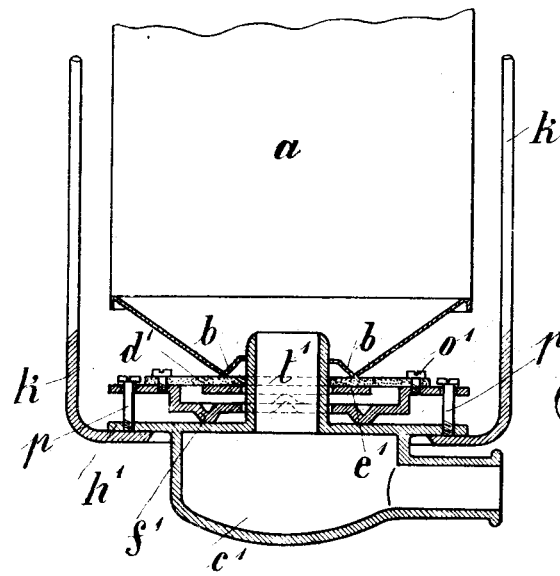
Witnesses.
Inventor.
Alexander Bernhard Dräger

UNITED STATES PATENT OFFICE.

ALEXANDER BERNHARD DRÄGER, OF LÜBECK, GERMANY, ASSIGNOR TO THE FIRM OF DRÄGERWERK HEINR. & BERNH. DRÄGER, OF LÜBECK, GERMANY.

UNIVERSAL COUPLING.

1,033,681.  Specification of Letters Patent.  Patented July 23, 1912.

Application filed January 12, 1911. Serial No. 602,233.

*To all whom it may concern:*

Be it known that I, ALEXANDER BERNHARD DRÄGER, a subject of the German Emperor, and resident of Lübeck, in the German Empire, have invented certain new and useful Improvements in Universal Couplings, of which the following is a specification.

The invention relates to connecting devices, that is to say, devices for forming joints between readily interchangeable hollow bodies and conduits in which the said bodies are inserted; the object being to form a perfectly air-tight joint in addition to insuring speedy interchangeability, as is necessary for example in the case of air regenerating or breathing cartridges for freely portable breathing (or so-called life-saving) apparatus which must be changed in the presence of poisonous gases. The invention resides mainly in the fact that a resilient or elastic washer is arranged around each connecting nipple of the conduit in such a manner that it rests upon plates adapted to be displaced in the manner of a Cardan joint; each of these plates rocks about an axis, the two axes crossing or intersecting. Owing to this arrangement, even when the cartridge is given an oblique position between the connecting devices the said washers rest uniformly around the cartridge apertures, so that inexactitude in the position of the packing surfaces and irregularities in the external form of the cartridge do not endanger the formation of an air-tight joint.

In the accompanying sheet of drawings: Figure 1 shows partly in section a part of the portable breathing apparatus viz. a breathing cartridge inserted between the connecting nipples of the inlet and outlet boxes of the air conduit and held in position and in air-tight connection at each end by a device constructed in accordance with and embodying my invention; the device connecting the lower or bottom end of the cartridge with the connecting nipple shows a somewhat modified form of construction; the middle portion of the cartridge and the rods connecting the said inlet and outlet boxes being broken away. Figs. 2 to 6 are detailed views in perspective of the inlet box and the several parts constituting the improved resilient or elastic connecting device of the first embodiment of the invention. Figs. 7 to 9 are detailed views in perspective of the several parts constituting the connecting device of the second embodiment of the invention.

Similar letters of reference refer to similar parts throughout the several figures.

In Fig. 1 $a$ designates the air regenerating cartridge, $b$ the cartridge apertures at each end, $c$ the air inlet box and $c^1$ the air outlet box of the air conduit of the apparatus, $i, k, m$ a connecting means for holding in position the said boxes, $t$ and $t^1$ the connecting nipples of the latter, and $h$ and $h^1$ the base flanges secured to the boxes $c$ and $c^1$ respectively.

In the upper part of Fig. 1 and in Figs. 3 to 6 $d$ designates the resilient or elastic annular washer and $e$ and $f$ the annular plates.

The plates $f$ and $e$ and the washer $d$ are put upon the nipple $t$ in the manner disclosed by Fig. 1 and the washer $d$ is secured to the base flange $h$ forming a seat for the said washer by means of a ring $g$ fixed to the flange $h$ by means of screws $o$. The aperture $b$ of the cartridge $a$ bears or rests against the washer $d$ which is movable by means of the construction and arrangement shown in the manner of a vibratory plate or membrane.

In the example illustrated in the lower part of Fig. 1 and in Figs. 7 to 9 the annular elastic washer $d^1$ which here firmly surrounds the connecting nipple $t^1$ with which it forms an air-tight joint, is secured to the flange of the plate $f^1$ by means of screws $o^1$, in order to prevent it from becoming loose, and the plate $f^1$ is secured to the base flange $h^1$ by means of loosely placed screw bolts $p$ located in the axis of vibration of the plate $f^1$.

I claim:

1. In a device of the character described, the combination with a hollow body, of a nipple adapted to project through an aperture in said body, a flexible washer surrounding the nipple and adapted to engage the end of said body, and a universally movable plate interposed between the washer and one end of the nipple.

2. In a device of the character described, the combination with a hollow body, of a nipple adapted to project through an aperture in said body, a flexible member surrounding the nipple and on which the end of said body is supported, and a universally movable plate movable independently of the body interposed between the washer and one end of the nipple.

3. In a device of the character described, the combination with a hollow body, of a nipple adapted to project through an aperture in said body, a flexible washer surrounding the nipple and adapted to engage the end of said body, means to connect the outer edge of the washer with the nipple, and universally movable annular plates upon which the washer rests.

4. In a device of the character described, the combination with a hollow body, of a nipple adapted to project through an aperture in said body, a flexible washer surrounding the nipple and having its outer edge secured to a flange on the latter, and universally movable plates interposed between the washer and the inlet end of the nipple to hold said washer onto the end of the hollow body.

ALEXANDER BERNHARD DRÄGER.

Witnesses:
 FRIEDRICH GLATH,
 JOHS. WULF.